United States Patent [19]

Amjad et al.

[11] Patent Number: 4,960,522

[45] Date of Patent: Oct. 2, 1990

[54] COPOLYMERS OF AN ACRYLIC ACID AND ALKOXYALKYL ACRYLATE AS SCALE INHIBITORS

[75] Inventors: Zahid Amjad, Avon Lake; William F. Masler, Hinckley, both of Ohio

[73] Assignee: The B. F. Goodrich Company, Akron, Ohio

[21] Appl. No.: 400,436

[22] Filed: Aug. 30, 1989

Related U.S. Application Data

[63] Continuation-in-part of Ser. No. 929,970, Nov. 16, 1986, abandoned.

[51] Int. Cl.$^5$ .............................................. C02F 5/10
[52] U.S. Cl. .................................... 210/701; 252/180
[58] Field of Search ............................... 210/698–701; 252/180, 181; 426/271; 524/555; 526/307

[56] References Cited

U.S. PATENT DOCUMENTS

| | | | |
|---|---|---|---|
| 3,790,610 | 2/1974 | Lum et al. | 210/701 |
| 3,880,765 | 4/1975 | Watson | 210/701 |
| 4,209,398 | 6/1980 | Ii et al. | 252/180 |
| 4,435,556 | 3/1984 | Masler et al. | 252/180 |
| 4,469,615 | 9/1984 | Tsuruoka et al. | 210/701 |
| 4,499,002 | 2/1985 | Masler et al. | 526/307.5 |
| 4,618,448 | 10/1986 | Cha et al. | 210/701 |
| 4,818,506 | 4/1989 | Lin et al. | 210/701 |

FOREIGN PATENT DOCUMENTS

| | | | |
|---|---|---|---|
| 614685 | 2/1961 | Canada | 210/701 |
| 59-173198 | 10/1984 | Japan | 252/180 |

*Primary Examiner*—Peter Hruskoci
*Attorney, Agent, or Firm*—George A. Kap; Nestor W. Shust

[57] ABSTRACT

Water is treated with copolymers of an acrylic acid and an alkoxyalkyl acrylate ester which are devoid of acrylamide or methacrylamide. The copolymers are effective as scale inhibitors in the presence or absence of metal ions, particularly iron, manganese and zinc; and to stabilize or solubilize soluble metal ions such as iron, manganese, and zinc.

4 Claims, No Drawings

COPOLYMERS OF AN ACRYLIC ACID AND ALKOXYALKYL ACRYLATE AS SCALE INHIBITORS

REFERENCE TO RELATED APPLICATION

This is a continuation-in-part of application Ser. No. 929,970 filed Nov. 16, 1986 now abandoned and entitled "Copolymers Of An Acrylic Acid and Alkoxyalkyl Acrylate As Scale Inhibitors".

BACKGROUND OF THE INVENTION

This invention generally relates to the inhibition of scale formation and deposition in aqueous systems by adding thereto an effective threshold amount of a copolymer of an acrylic acid and an alkoxyalkyl acrylate. In a preferred embodiment, the addition of a defined copolymer to an aqueous system results in unexpectedly high levels of scale inhibition. Specific applications contemplated herein are aqueous systems used in recirculating cooling towers, desalination, oil field applications particularly in seCondary oil recovery operations, flash distillation, as well as in aqueous systems such as milk, fruit juices, and sugar solutions. These copolymers are effective scale inhibitors against such scales as calcium phosphate, calcium carbonate, calcium sulfate, and are effective as dispersants of particulates and stabilizers of metal ions.

The invention disclosed herein is an improvement over the invention disclosed in U.S. Pat. No. 4,499,002 of inventors Masler and Amjad. Whereas the invention in U.S. Pat. No. 4,499,002 is directed to the use of a copolymer of an acrylic acid, an acrylamide, and an alkoxyalkyl acrylate, the invention herein is directed to the use of a copolymer as a scale inhibitor which is devoid of an acrylamide, i.e., a copolymer of an acrylic acid and an alkoxyalkyl acrylate This is very surprising since in col. 2, lines 31–33 of U.S. Pat. No. 4,499,002, it is stated that a copolymer of an acrylic acid and an alkoxyalkyl acrylate has very little activity as a scale inhibitor. The copolymers of acrylic acid and alkoxyalkyl acrylates noted in U.S. Pat. No. 4,499,002 were prepared in water whereas the same copolymers herein were prepared in a solvent. This appears to render the copolymers effective as scale inhibitors. It should be understood, however, that it is now possible to prepare the copolymers in water and have them effective as scale inhibitors.

SUMMARY OF THE INVENTION

This invention pertains to the use of certain copolymers at a threshold inhibition level in an aqueous medium to inhibit scale precipitation in the absence or the presence of metal ions such as iron, manganese, and zinc; and to stabilize or solubilize soluble metal ions such as iron, manganese, and zinc. The copolymers, which are devoid of an acrylamide, are copolymers of a preponderant amount of an acrylic acid and a lesser amount of an alkoxyalkyl acrylate containing at least one and up to 5 alkoxy groups per molecule. Such copolymers are particularly effective in inhibiting precipitation of calcium phosphate, magnesium phosphate, zinc phosphate, calcium silicate, magnesium silicate, magnesium hydroxide, zinc hydroxide, iron oxide, and mixtures thereof. Such copolymers are water-soluble, essentially non-crosslinked random copolymers consisting of an acrylic acid and an alkoxyalkyl acrylate.

DETAILED DESCRIPTION OF THE INVENTION

There is presently a preference for treating an aqueous medium at a high pH with non-chromate corrosion inhibiting materials such as phosphates, which leads to formation of calcium phosphate and other calcium salt deposits. This particularly applies to recirculating cooling water and boiler water which are prone to scale-forming precipitation of calcium, magnesium and iron salts, particularly calcium and magnesium phosphates, under presently preferred neutral to alkaline conditions. The use of the copolymers described herein in an aqueous medium reduces the deposition of scale-forming salts on surfaces of equipment within which the aqueous medium is contained.

This invention is directed to the use of the copolymers of an acrylic acid and an alkoxyalkyl acrylate in an aqueous medium at a level of 0.01 to 200 ppm, preferably 0.1 to 50 ppm to inhibit deposition of precipitates, particularly those selected from calcium phosphate, calcium carbonate, calcium sulfate, magnesium hydroxide, calcium silicate, magnesium silicate, iron oxide, zinc hydroxide, zinc phosphate, and mixtures thereof.

The copolymers of this invention are especially useful in cooling water systems, including cooling towers, in which systems scale is synonymous with deposits which result from crystallization or precipitation of salts from solution. Scale formation is influenced by the temperature of the water in a particular location, the concentration of the inorganic salts dissolved in the water, pH of the water, and other factors. It is this scale formation and deposition which is sought to be inhibited.

The copolymers of this invention are devoid of acrylamide or methacrylamide and are water-soluble, essentially non-crosslinked random copolymers. They consist essentially of a major proportion of at least one monounsaturated monocarboxylic acid monomer of 3 to 4 carbon atoms, and water-soluble salts thereof, and a minor proportion of at least one alkoxyalkyl acrylate or methacrylate ester. Preferred acids are acrylic and methacrylic acids and water-soluble salts thereof. Preferred esters contain at least one alkoxy group and up to 5, especially 1 to 3 of such groups, each containing 1 to 6 carbon atoms, and one alkyl group containing 1 to 6 carbon atoms. Amount of the acid is 50% or above, such as 50 to 95%, preferably 55 to 90% whereas amount of one or more esters forms the remainder to 100%, on weight basis. Suitable examples of the esters include methoxyethyl acrylate, 2-(2-ethoxyethoxy) ethyl acrylate, ethoxytriglycol acrylate, 2-ethoxyethyl methacrylate, and the like.

The copolymers defined above must be soluble in water. Although a copolymer is used in amount of up to 200 ppm in water, solubility of such copolymers should be at least 20 weight parts per 100 weight parts of water. The high solubility of the copolymers is not essential but desirable since the copolymers are shipped in drums as a concentrated aqueous solution containing about 20 to 50% by weight solids. As the proportion of the alkoxyalkyl acrylate ester units in the copolymer increases, its solubility in water decreases and this limits the relative ratio of the alkoxylated repeating units to the nonalkoxylated units in the copolymer. It is preferred to have 10 to 45% by weight of the alkoxyalkyl acrylate ester in the copolymer.

In a preferred process embodied in this invention for preparing an alkoxyalkyl acrylate, an acrylic acid is esterified with an alkoxylated lower primary alcohol and then subsequently polymerized under controlled conditions. The alkoxylated lower primary alcohol is prepared initially by reacting an excess of a lower alkylene oxide with a primary alcohol. The lower alkylene oxide contains 2 to 6 carbon atoms and is preferably selected from ethylene oxide, propylene oxide and butylene oxide whereas the primary alcohol contains 1 to 10 carbon atoms or is preferably selected from lower primary alcohols containing 1 to 6 carbon atoms. Especially preferred alkoxyalkyl acrylates are prepared by esterifying acrylic acid with 2-(2-ethoxyethoxy) ethanol.

Polymerization of an acrylic acid and an alkoxyalkyl acrylate ester is effected in a mutual solvent for them, preferably, for the example, in a hydrocarbon solvent whether aliphatic or aromatic, a lower alkanol having from 1 to about 6 carbon atoms, or in water, with an effective amount of a free radical initiator sufficient to produce the desired composition within an acceptable period of time.

The copolymers may be formed in an acyclic ketone such as acetone, or in an acyclic ester such as ethyl acetate, or in xylene or toluene. If, for example, the copolymer is formed in isopropanol or a mixture of isopropanol and water, the copolymer is converted from the alcohol solution to a water solution Typically, the alcohol is stripped from the solution with steam or distilled off with subsequent additions of water and repetition of distillation to remove the alcohol, followed by the addition of water and a neutralizing agent such as caustic solution, ammonia, a hydrazine or a low-boiling primary, secondary or tertiary aliphatic amine.

Typically, from about 0.2 to 5 weight parts of an initiator is used per 100 weight parts of monomer. Preferred initiators include benzoyl peroxide, peracetic acid, hydroxyheptyl peroxide, isopropyl peroxydicarbonate, methyl ethyl ketone peroxide, cyclohexane peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, caprylyl peroxide, methyl cyclohexyl hydroperoxide, t-butyl permaleic acid, t-butyl perbenzoate, di-t-butyl diperphthalate, azobis-isobutyronitrile, the so-called redox and heavy metal polymerization initiators and the like, and others. The copolymer is usually formed in high conversion usually in excess of 90% conversion and often as high as 95 to 100%.

The final aqueous solution of polymer salt is preferably in the range from about PH 3 to about pH 8, and more preferably in the range of PH 5 to 7, with a total solids content of from about 2 to about 60 percent by weight and preferably from about 5 to about 50 percent by weight of polymer in water.

The copolymers formed may have a weight average molecular weight in the range from about 1000 to about 50,000, and preferably from about 2000 to about 20,000, as determined by gel permeation chromatography. This determination is conventionally made according to ASTM method D-3536-76, part 35, 1980, by dissolving the esterified copolymer in tetrahydrofuran and comparing with a solution in THF of polystyrene of known molecular weight. The acid numbers of the copolymers formed, as determined by a conventional titration with KOH, may range from about 235 to about 585, corresponding to a weight fraction of from 30% to about 75% by weight of monomer units having COOH groups. The preferred polymers have more than 30% by weight of free carboxyl groups and an acid number in the range from about 400 to about 650.

In a typical polymerization process, a glass lined or stainless steel jacketed reactor is charged with predetermined amounts of monomers and solvent along with the polymerization catalyst under a nitrogen blanket, and the reaction mixture is allowed to exotherm under controlled temperature conditions maintained by a heat-transfer fluid in the jacket of the reactor. The pressure under which the reaction occurs is not critical, it being convenient to carry it out under atmospheric pressure.

The invention disclosed herein is illustrated by the examples appearing below which describe preparation of the copolymers and demonstrate their efficiency as scale inhibitors, metal ion stabilizers and as dispersants of particulate matter.

EXAMPLE 1

This example demonstrates the preparation of the copolymer of acrylic acid and ethoxytriglycol acrylate (EOTGA).

A monomer premix was prepared by mixing acrylic acid (80 grams) and EOTGA (20 grams) and this mixture was charged to a reservoir connected to a piston metering pump. The pump was set to deliver the monomer mixture in 2.0 hours.

A polymerization solvent mixture was prepared from anhydrous isopropanol (126 g) and water (24 g). About 20 g of this mixture was used to dilute the initiator, t-butylperoxypivalate, 75% in mineral spirits, (3 g). The initiator solution was charged to a syringe in a syringe pump. The balance of the solvent was charged to a 500 ml 3-neck round bottom flask equipped with a mechanical stirrer, reflux condenser, and inlets for the monomer and initiator.

The flask was swept with nitrogen and held under a slight positive pressure of nitrogen during the polymerization. The solvent was heated to reflux and the metering of monomer and initiator was begun simultaneously. The monomer was metered in over 2.0 hours and the initiator over 2.5 hours. When all the initiator was in, the mixture was heated one hour longer to ensure complete polymerization. The product was isolated by steam stripping to remove the solvent.

The polymer solution in water was partially neutralized by the addition of 50% sodium hydroxide (66.7 g). The final product weighed 369 g and contained 32.0% solids, about 84% of which was due to polymer, with the remainder being from sodium. The final product had a Brookfield viscosity of 76 cps and a PH of 5.9. The unneutralized product had an acid number of 589 and its weight average molecular weight was 5900 (by gpc).

In an analogous manner, copolymers were formed by substituting methoxy ethyl acrylate, 2-(2-ethoxyethoxy) ethyl acrylate, 2-ethoxyethyl methacrylate for the ethoxytriglycol acrylate. Similarly, methacrylic acid was used together with acrylic acid to form the copolymers to provide compositions with excellent scale inhibition activity.

As one skilled in the art will readily appreciate, the molecular weight of the copolymers formed will vary in accordance with the proportion of monomers charged to the reaction flask and also with the precise conditions of polymerization.

EXAMPLE 2

This example demonstrates effectiveness of the copolymers disclosed herein as scale inhibitors against calcium phosphate.

The copolymers formed in the manner described herein, were used to treat water which contained calcium ions and phosphate ions in a stirred pH-STAT test while maintaining constant pH and using an automatic titrator to gauge the effectiveness of the polymer for inhibiting the formation and deposition of calcium phosphate. The test was carried out as follows: a known volume of a phosphate salt solution, such as $Na_2HPO_4$ or another soluble phosphate salt solution, was transferred to a known volume of distilled water in a double-walled glass cell to give a final concentration of 9-10 ppm of orthophosphate ions. To this solution, was added slowly and with continuous stirring a known volume of test polymer solution sufficient to give a dosage of 10 ppm.

A pair of glass and reference electrodes, which were calibrated before and after each experiment with standard buffer solutions of pH 7.00 and 9.00, was then immersed in the solution which was maintained at 50° C. by circulating water through the outside of a glass cell jacket. After about 45 minutes, a known volume of calcium chloride solution was slowly added to the continuously stirred solution containing phosphate and polymer, to give a final calcium ion concentration of 140 ppm. The PH of the solution was then immediately brought to pH 8.50 by automatic addition of 0.10 M NaOH solution. The pH of the solution was then maintained at 8.50±0.01 throughout the experiment using the pH stat technique.

Solution samples were withdrawn after 1 hour and 22 hours, and analyzed, after filtration through 0.22 micrometer filter paper, for orthophosphate ions using the ascorbic acid method, as described in detail in "Standard Methods for the Examination of Water and Waste Water" 14th edition, prepared and published jointly by American Health Association et al. The instrument used for the colorimetric measurements was a Beckman 5270 Spectrophotometer.

Tests for calcium sulfate and calcium carbonate were carried out by the method of Ralston, see J.Pet.Tech., August 1969, 1029-1036.

The percent threshold inhibition (TI) attained for each experiment was obtained using the following formula, shown in this case for calcium phosphate:

$$\%TI = \frac{(PO_4)\ exp - (PO_4)\ final}{(PO_4)\ initial - (PO_4)\ final} \times 100$$

where
- $(PO_4)$ exp = concentration of phosphate ion in the filtrate in presence of the copolymer at time 1 and 22 hours
- $(PO_4)$ final = concentration of phosphate ion in filtrate in absence of the copolymer at time 22 hours
- $(PO_4)$ initial = concentration of phosphate ion at time zero.

The results of the tests are presented in Table 2, below, where approximate weight average molecular weight of the copolymers is given together with percent threshold inhibition for calcium phosphate. Threshold inhibition indicates the percent of scale-forming salt that remained in solution which would have normally precipitated out.

TABLE 2

| Copolymer | Composition | Mol. Wt. | % THRESHOLD INHIBITION Ca/PO$^a_4$ | CaSO$^b_4$ | CaCO$^c_3$ |
|---|---|---|---|---|---|
| None | — | — | 0 | 0 | 0 |
| AA:EOTGA | 80:20 | 6,000 | 60(18) | 62 | 69 |
| AA:MeOEA | 80:20 | 6,000 | 76(21) | 76 | 79 |
| AA:MAA:CA | 60:20:20 | 10,000 | 78(36) | 48 | 74 |
| AA:MAA:EOTGA | 60:20:20 | 10,000 | 71(54) | 65 | 76 |
| AA:MAA:MeOEA | 60:20:20 | 10,000 | 90(27) | 55 | 68 |
| PAA | 100 | 5,100 | 16(11) | 66 | 68 |

$^a$Conditions: ACa = 140 ppm, PO$_4$ = 9.2 ppm, pH = 8.50, T = 50° C., Time = 22 hours, polymer = 10 ppm
$^b$Conditions: Ca = 224 ppm, HCO$_3$ = 760 ppm, CO$_3$ = 18 ppm, T = 67° C., Time = 24 hours, polymer = 3 ppm
$^c$Conditions: Ca = 2,000 ppm, SO$_4$ = 4,800 ppm, T = 67° C., Time = 24 hours, polymer = 2 ppm In the above table, the following contractions appear:
AA = acrylic acid
MAA = methacrylic acid
MeOEA = methoxyethyl acrylate
EOTGA = ethoxytriglycol acrylate
CA = 2-(2-ethoxyethoxy) ethyl acrylate The first copolymer shown in Table 2 is the copolymer consisting of 80 weight parts acrylic acid and 20 weight parts of ethoxytriglycol acrylate with a molecular weight of about 6,000. This copolymer gave 60% threshold inhibition with respect to calcium phosphate. This means that 60% of calcium phosphate in the solution was maintained in solution with the aid of the copolymer. The other copolymers gave varying levels of threshold inhibition. Polyacrylic acid had calcium phosphate threshold inhibition of 16%, calcium sulfate inhibition of 66% and calcium carbonate inhibition of 68%. The numbers in parenthesis give percent inhibition for calcium phosphate in presence of 1 ppm of soluble iron. Threshold inhibition in excess of 60%, preferably in excess of 75%, and especially in excess of 80%, is considered to be suitable herein.

EXAMPLE 3

Many different copolymers were tested to determine their ability to stabilize iron (III) and zinc (II) in aqueous solutions. Aqueous solutions were prepared containing the following ions in amounts indicated.

| | Fe (III) | Zn (II) |
|---|---|---|
| Ca = | 300 ppm | 60 ppm |
| Mg = | 296 ppm | 20 ppm |
| Na = | 1113 ppm | 202 ppm |

| -continued | | |
| --- | --- | --- |
| | Fe (III) | Zn (II) |
| Cl = | 2170 ppm | 172 ppm |
| SO4 = | 700 ppm | 200 ppm |
| HCO3 = | 28 ppm | 36 ppm |
| Iron (III) = | 1.0 ppm | 0 |
| Zn (II) = | 0 ppm | 6.0 |
| pH = | 7.0 | 8.5 |
| Temp, °C. = | 22 | 30 |
| Time, hours = | 2.0 | 22.0 |
| Polymer Dosage = | 2.0 ppm | 4.5 ppm |

Static test conditions were employed. After completion of the tests, amounts of iron and zinc in solution were determined by atomic absorption. The effective of the polymers tested against soluble iron and zinc are given below in terms of percent stabilization.

TABLE 3

| | | % Stabilization | |
| --- | --- | --- | --- |
| Composition | Mol. Wt. | Fe (III) | Zn (II) |
| PAA | 5,800 | 1 | 22 |
| AA:MeOEA 80:20 | 6,000 | 83 | 63 |
| AA:MAA:CA 60:20:20 | 10,000 | 82 | 78 |
| AA:MAA:EOTGA 60:20:20 | 10,000 | 72 | 67 |
| AA:MAA:MeOEA 60:20:20 | 10,000 | 92 | 71 |
| AA:MAA:CA 60:20:20 | 10,000 | 66 | 68 |
| AA:EOTGA 80:20 | 6,000 | 42 | 67 |

In the above table, percent stabilization means amount of metal ions remaining in solution. High values indicate better polymer effectiveness in stabilizing metal ions. For instance, 63% stabilization means that 63% of the metal ion remained in solution and did not precipitate out.

As already noted, the copolymers disclosed herein are effective as scale inhibitors against calcium carbonate, calcium sulfate, and calcium phosphate and as dispersants against particulates such as iron oxide, clay, silt, and other suspended particulate matter. Also, the herein-disclosed copolymers are effective in stabilizing metal ions, such as iron, zinc and manganese, and their reaction products. Furthermore, the herein-disclosed copolymers are effective scale inhibitors in the presence of solubilized metal ions.

We claim:

1. A method for inhibiting formation and deposition of scale-imparting precipitates, including calcium phosphates, in an aqueous medium containing scale-imparting precipitates under deposit-forming conditions comprising the step of adding to said aqueous medium at least an effective threshold inhibition amount to obtain threshold inhibition of calcium phosphate of at least 75% of a copolymer selected from the group consisting essentially of the following copolymers (a), (b), (c), and mixtures thereof:

(a) 80:20 AA:MeOEA
(b) 60:20:20 AA:MAA:CA
(c) 60:20:20 AA:MAA:MeOEA wherein relative amounts of the moieties of the comonomers in the copolymers are given in weight parts, and wherein AA represents acrylic acid
MAA represents methacrylic acid
CA represents 2-(2-ethoxyethoxy) ethyl acrylate
MeOEA represents methoxyethyl acrylate.

2. Method of claim 1 wherein molecular weight of said copolymer is in the range of about 1,000 to about 50,000 and wherein amount of said copolymer added to said aqueous medium is in the range of about 0.01 to 200 ppm.

3. Method of claim 2 wherein said aqueous medium also contains solubilized metal ions and said aqueous medium is selected from the group consisting essentially of recirculating cooling water and desalination water.

4. Method of claim 3 wherein said metal ions are solubilized iron, wherein molecular weight of said copolymer is in the range of about 2,000 to 20,000, and wherein amount of said copolymer added to said aqueous medium is 0.1 to 50 ppm.

* * * * *